Patented Mar. 9, 1954

2,671,797

UNITED STATES PATENT OFFICE 2,671,797

NEUTRALIZATION OF SULFONIC ACIDS AND SULFURIC ACID ESTERS

August Hagemann, Duisburg-Meiderich, Helmut Kolling, Duisburg-Hamborn, and Eugen Jacob, Oberhausen-Holten, Germany, assignors to Ruhrchemie Aktiengesellschaft, Oberhausen-Holten, Germany, a German corporation No Drawing. Application February 15, 1951, Serial No. 211,194

7 Claims. (Cl. 260—459)

This invention relates to improvements in the neutralization of sulfonic acids and sulfuric acid esters.

Alkyl, aryl or alkyl-aryl sulfonic acids or sulfuric acid esters, made from alcohols or olefines, are neutralized with alkalies in stages or in continuous working process for the manufacture of sulfonates. The present method is to dissolve the sulfonic acids or the sulfuric acid esters in water and neutralize them with aqueous alkali lyes. After the neutralization, the water added or formed during the reaction is removed by evaporation or atomization in the known manner. Neutralizations of this type have also been carried out on fast rotating plates provided with jets on which the sulfonic acid and the aqueous alkali solution are poured. The rotating plate scatters the mixture of the reactants in fine particles into a reaction chamber into which hot air is blown at the same time. The immediate end product is a dried washing agent (detergent). These well-known methods are not advantageous because comparatively large quantities of water have to be evaporated.

Prior to the present invention this evaporation has been considered to be absolutely necessary for obtaining a uniform and complete reaction between the sulfonic acid and the alkalies. Besides this, these known processes will not allow the use of any alkali carbonates which lead to the formation of a disturbing foam.

One object of this invention is the neutralization of sulfonic acids and/or sulfuric acid esters without the aforementioned difficulties. This and further objects will become apparent from the following description and examples.

According to the invention it is now possible to obtain solid sulfonated washing agents without the superfluous evaporation if the sulfonic acids and/or the sulfuric acid esters are intimately contacted with at least one of solid anhydrous alkali hydroxides and alkali carbonates.

The intimate contacting of the reactants can be effected in various ways, e. g. by kneading or stirring them together or by a simultaneous atomization or spraying of the acid and alkaline components. In this process, the use of small quantities of water is advantageous for an acceleration of the reaction. The quantity of water need not exceed 10–15% of the amount of the acid that is to be neutralized, which is considerably less than the quantity of water to be evaporated during the neutralization with alkali hydroxide or alkali carbonate solutions. The water to be used for the acceleration of the reaction may be put into the sulfonic acids or sulfuric acid esters prior to neutralization, or can be added directly into the reaction chamber during the conversion of the components.

The process can be carried out for example in known kneading machines provided with stirrer blades as the Werner-Pfleiderer system, into which the sulfonic acid is poured and the solid alkali hydroxides or alkali carbonates are added continuously or intermittently, while the kneading proceeds. Due to the slow addition of the alkali compounds, the heat of reaction can be maintained below 70–80° C. An excessive increase of the temperature can also be avoided by a suitable cooling of the kneading machine.

The added caustic alkalies first neutralize the free sulfuric acid still present in the sulfonic acid. After that, the neutralization proceeds more slowly. It can be considerably accelerated if small amounts of water are added to the reacting mixture. However, the amount of water must not be more than 15% of the reacting mixture, at the most. The water may be added gradually simultaneously with the balance of the neutralizing material; in small quantities into the reacting mass, or after the neutralizing material and the reacting mass have been completely mixed. The method and quantity of the water addition should be adapted to the consistency of the reacting mass which gradually changes into a firm dough-like mass as the neutralization progresses.

The sulfonic acid may be neutralized without any difficulty with sodium or potassium carbonate as the escaping carbon dioxide cannot produce any obnoxious foam formation in the relatively firm reacting mass. Depending on the neutralization agent used, the kneading process will take approximately 2–4 hours until the neutralization is completed.

The end product of the conversion can be rolled and ground immediately, as it comes out in the shape of thin ribbons, which can easily be completely de-hydrated over roller or belt driers.

Besides being able to use cheap alkali carbonate, the principal advantage of the process according to the invention lies in the fact that it does not require any extensive evaporation of the water. Only the small amounts of water added during the neutralization and the generated water of reaction have to be removed. The largest part of these quantities of water is already evaporated by the heat generated during the reaction.

The process may be carried on continuously by the use of a conveyor worm or by the use of a self-discharging kneading machine. The required alkaline compounds and the small quantities of water can be automatically added to the reaction mixture, at suitable places on its way through the machinery. With this method of operation the delivered end product is absolutely dry and ready for use.

Effecting the process according to the invention in a large reaction container, into which sulfonic acid or sulfuric acid ester in the finest possible dispersion and finely ground, dry alkali carbonates are simultaneously sprayed, in at least, equivalent quantities, is considerably advantageous. If the spray of the reactants is sufficiently fine, the conversion can be completed in a comparatively short time although sulfonic acids and sulfuric acid esters react slowly with alkali carbonates that are not in the form of fine sprays. Disturbances by the escaping carbon dioxide can not occur in this working process.

The spraying of the liquid sulfonic acid or sulfuric acid ester can be done in the usual manner, e. g. through spray nozzles or fast rotating disks. The fine distribution of the dry akali carbonates can also be effected by means of a spray nozzle, in which case the required amount of the completely dry and finely pulverized alkali carbonates have to be brought in by air or gas flow spray. The sulfonic acid spray and the dust spray of the alkali carbonates must be so directed toward each other that an intimate contacting of the two finely dispersed reactants is obtained. A mixture of this kind is fairly easily obtained by a suitable arrangement of the spray nozzles or other dispersion installations. It is especially effective if the sulfonic acid and the alkali carbonates are sprayed out of the same nozzle.

Through the amount of the air used for the distribution of the dry pulverized alkali carbonates as well as by blowing additional amounts of air into the reaction chamber, the dissipation of the generated heat of reaction can be easily regulated in such a way that the heat of reaction does not exceed the upper temperature limit. For the technical execution of the process according to the invention different kinds of apparatus and installations can be used in which there is sufficient room for the intermixture of the reactants so that the sprayed material has a sufficiently long passage to go through and thus react in before it is impeded, e. g. on the walls of the reaction container.

The process according to the invention can, for instance, be carried out in vertical towers, in which the reactants are sprayed from the top toward the bottom. The spraying installations for the sulfonic acids or the sulfuric acid esters and for the pulverized, dry alkali carbonates, or the single spray nozzle for both media must be arranged in the upper part of this tower in a suitable position. Thorough distribution of the reactants in a tower can also be accomplished in such a way that the spray is directed from the bottom toward the top. In this way, the sprayed material, which finally collects on the bottom of the tower, passes through almost twice the space and, besides, stays a longer time in the free space when coming down than when the spraying is done from the top toward the bottom. The stay of the sprayed product can be further prolonged by blowing air tangentially into the tower in several places, which will produce a rotary motion of the sprayed material.

The sprayed material, which collects on the bottom of the tower, is a film foamy mass whose reaction is not completed. The mass must be removed from the tower, e. g. with scrapers. Being left there, or possibly on a conveyor belt, for 30–120 minutes completes the neutralization reaction. During this time, the product has become firmer and can be homogenized by successively arranged rollers and can possibly be treated with hot air in order to dry it completely. When using suitably placed spray nozzles for the reactants, the neutralization of the sulfonic acids or sulfuric acid esters can be carried out without any or only a small addition of water, so that no appreciable effort is needed for the evaporation. Furthermore, a high output with simple installations and end products which are completely neutralized are obtained.

The following examples are given by way of illustration and not limitation.

*Example 1*

40 kilos of a sulfonated material, which was derived from $C_{10}$-monoalkyl benzol, was poured into a kneading machine (e. g. system-Werner-Pfleiderer), which was provided with blades and was covered with corrosion-resistant material on the inside. It consisted of 35.1 kilos of sulfonic acid, 3.6 kilos of sulfuric acid and 1.3 kilos of water. While the kneading was going on continuously, 11.1 kg. of finely pulverized dehydrated sodium carbonate (96% of $Na_2CO_3$) was intermittently added in such quantities that the temperature of the reacting mass did not exceed 70°. This required 30 minutes. During the next 30 minutes 3500 cc. of water were added and, after that, the mass was kneaded for two additional hours. After that the neutralization was completed. The mass had such a consistency that it could immediately be ground between rollers. The dried finished product was of a pure white color and contained 87% sodium sulfonate and 12% sodium sulfate.

*Example 2*

35 kilos of a sulfonated material, which was gained by sulfonating $C_{12}$-mono-alkyl-benzol was poured into the kneading machine mentioned in Example 1. The material consisted of 29.7 kilos of sulfonic acid, 3.5 kilos of sulfuric acid and 1.8 kilos of water. While the kneading was going on continuously, 6.6 kilos of pulverized caustic soda were added in such a manner that the temperature did not exceed 70° C. Then 25,000 cc. of water were likewise added in such a manner that the reaction temperature did not exceed the limit of 70° C. The total time of stirring was approximately 3 hours. Thereafter neutralization was completed. The mass could be ground between rollers and subsequently be dried by means of hot air. The finished purely white salt contained 86% sodium sulfonate and 14% inorganic salts.

*Example 3*

17.8 kilos of dehydrated sodium carbonate were filled into the kneading machine mentioned in Example 1. While the kneading was going on continuously, 40 kilos of a sulfonated mixture were added, which had been obtained by sulfonating a $C_{12}$ alcohol and which consisted of 24.0 kilos of sulfuric acid esters, 11.7 kilos of sulfuric acid and 4.3 kilos of water. The kneading machine was cooled with water. The addition of the sulfonated mixture was carried out so slowly that the temperature of the reaction mass did not exceed 25–30° C. The total time of stirring was 6 hours. After that the neutralization was completed. The reaction mass was removed, ground between rollers and dried with hot air. The finished salt contained 60% sodium sulfonate and 40% inorganic salts.

*Example 4*

20 kg. per hour of sulfonic acid, which was produced by sulfonizing mono-alkyl-benzol, which had an aliphatic chain of 10 C atoms, was sprayed from the bottom toward the top of a tower 4 m. high and 1.5 m. in diameter by means of a spray nozzle placed in the lower part of the tower. This quantity of sulfonic acid had been previously diluted with 8% of water and (still) contained 1.84 kg. of sulfuric acid. The atomization was effected by means of an air current into which had been injected hourly 5.6 kg. of finely pulverized and well-dried anhydrous sodium carbonate (96% $Na_2CO_3$). The pulverized material collected on the bottom of the tower and was constantly removed with a scraper. After a storage of 1 hour, it was homogenized by means of rollers and, subsequently, completely dried by a hot air blower. The finished product was purely white, contained 15% of inorganic salts and 85% of sodium sulfonate, and its reaction was neutral.

*Example 5*

A mono-alkyl-benzol fraction was prepared, by chlorination and alkylation with benzene and distillation, from a $C_{12}$ petroleum fraction freed from aromatic hydrocarbons and having a content of 75% of aliphatic substances and of 25% of naphthenic substances. This fraction was sulfonized with concentrated sulfuric acid resulting in a reaction product which consisted of 86.7% by weight of sulfonic acid, 9.3% by weight of sulfuric acid and 4.0% by weight of water. This mixture was sprayed from the top toward the bottom of a tower 4 m. high and 2 m. in diameter by means of a spray nozzle placed in the upper part of the tower. The atomization was effected by means of an air current into which had been injected hourly 4.2 kilos of most finely pulverized anhydrous sodium carbonate. The sprayed material collected on the bottom of the tower. After a storage of 2 hours, neutralization was completed. The salt was removed and completely dried with hot air of 80° C. It consisted of 84% sodium sulfonate and 16% inorganic salts.

*Example 6*

A sulfonated mixture obtained by sulfonizing a mono-alkyl-benzol having an aliphatic side chain of 9 carbon atoms and which, after the addition of water, consisted of 76.2% by weight of sulfonic acid, 7.5% by weight of sulfuric acid and 16.3% by weight of water, was sprayed at a rate of 8 kilos per hour by means of a nozzle placed in the upper part of a tower 4 m. high and 2 meters in diameter. The atomization was effected by means of an air current into which had been injected hourly 2 kilos of dehydrated sodium carbonate. In the lower part of the tower m.³ per hour of air heated to 50° C. were simultaneously blown in tangentially. The reaction product collected on the bottom of the tower. After ¾ hours it was completely neutral and could be removed. It contained 81% sodium sulfonate, 13% inorganic salts and 6% water. By treating it with hot air it could easily be dried completely.

*Example 7*

10 kg. per hour of a sulfonated mixture, which was produced by sulfonizing mono-alkyl-benzol, which had an aliphatic side chain of 12 carbon atoms, the mixture consisting of 90% by weight of sulfonic acid, 7% by weight of sulfuric acid and 3% by weight of water, was sprayed by heating to 40° C. by means of a nozzle placed in the upper part of a tower 4 m. high and 2 m. in diameter. The atomization was effected by means of an air current into which had been injected hourly 2.7 kg. of most finely pulverized anhydrous sodium carbonate. By means of a second nozzle placed directly near the first nozzle, 1 kg. per hour of water was simultaneously sprayed. 40 m.³ of air heated to 40° C. were simultaneously blown in tangentially at the bottom of the tower. The reaction product collected on the bottom of the tower. After 1 hour it was completely neutral. It was removed and completely dried by a hot air blower. The product contained 86.5% by weight of sodium sulfonate and 13.5% by weight of inorganic salts.

We claim:

1. Process for the continuous neutralization of sulfonic acids and sulfuric acid esters which comprises intimately contacting in a reaction zone a finely divided dispersion of a member selected from the group consisting of sulfonic acids and sulfuric acid esters with a finely divided dispersion of solid, dry alkali carbonate in at least an equivalent quantity with said group member, and recovering a sulfonated product.

2. Process according to claim 1 which comprises allowing the fine dispersion of said group member and said alkali carbonate to settle, removing said dispersion from said reaction zone, storing said dispersion for about thirty to one hundred twenty minutes, and thereafter drying said sulfonated product.

3. Process according to claim 2 in which said product is homogenized prior to said drying.

4. Process according to claim 1 in which said intimate contacting is effected in the presence of a small amount of atomized water.

5. Process according to claim 4 in which said atomized water is added in amount not substantially exceeding 15% of the reaction mixture.

6. Process according to claim 1 in which said group member is atomized with small quantities of water prior to said intimate contacting.

7. Process according to claim 1 in which said intimate contacting is effected by simultaneously spraying in admixture said group member and said alkali carbonate into said reaction zone.

AUGUST HAGEMANN.
HELMUT KOLLING.
EUGEN JACOB.

References Cited in the file of this patent

UNITED STATES PATENTS

| Number | Name | Date |
|---|---|---|
| 2,062,454 | Henke | Dec. 1, 1936 |
| 2,088,308 | Schrauth | July 27, 1937 |
| 2,205,037 | Henke | June 18, 1940 |
| 2,214,254 | Mills | Sept. 10, 1940 |
| 2,231,979 | Wolter | Feb. 18, 1941 |
| 2,321,020 | Dreger et al. | June 8, 1943 |
| 2,325,320 | Holuba | July 27, 1943 |